United States Patent
Bakshi et al.

(10) Patent No.: US 9,391,967 B2
(45) Date of Patent: Jul. 12, 2016

(54) AUTHENTICATION FOR NETWORK ACCESS RELATED APPLICATIONS

(75) Inventors: Sanjay Bakshi, Portland, OR (US); Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,191

(22) PCT Filed: Dec. 28, 2011

(86) PCT No.: PCT/US2011/067532
§ 371 (c)(1),
(2), (4) Date: May 23, 2014

(87) PCT Pub. No.: WO2013/100954
PCT Pub. Date: Jul. 4, 2013

(65) Prior Publication Data
US 2014/0259115 A1    Sep. 11, 2014

(51) Int. Cl.
*G06F 7/04* (2006.01)
*H04L 29/06* (2006.01)
*H04W 12/06* (2009.01)
*H04L 9/32* (2006.01)

(52) U.S. Cl.
CPC .............. *H04L 63/08* (2013.01); *H04L 9/3234* (2013.01); *H04L 63/0492* (2013.01); *H04L 63/18* (2013.01); *H04W 12/06* (2013.01); *H04L 2209/805* (2013.01)

(58) Field of Classification Search
None
See application file for complete search history.

(56) References Cited

U.S. PATENT DOCUMENTS

| | | | |
|---|---|---|---|
| 2006/0183462 A1 | 8/2006 | Kolehmainen | |
| 2007/0245148 A1 | 10/2007 | Buer | |
| 2008/0052091 A1 | 2/2008 | Vawter | |
| 2008/0307223 A1* | 12/2008 | Brickell | H04L 63/126 713/158 |
| 2010/0058064 A1 | 3/2010 | Kirovski et al. | |
| 2011/0035604 A1* | 2/2011 | Habraken | 713/193 |
| 2011/0258120 A1 | 10/2011 | Weiss | |

FOREIGN PATENT DOCUMENTS

| | | |
|---|---|---|
| JP | 2006277199 A | 10/2006 |
| JP | 2010238090 A | 10/2010 |
| JP | 2011511355 A | 4/2011 |
| WO | 2011/057007 | 5/2011 |
| WO | 2013/100954 A1 | 7/2013 |

OTHER PUBLICATIONS

International Preliminary Report on Patentability and Written Opinion received for PCT Patent Application No. PCT/US2011/067532, mailed on Jul. 10, 2014, 6 Pages.

(Continued)

*Primary Examiner* — Brandon Hoffman
(74) *Attorney, Agent, or Firm* — Trop, Pruner & Hu, P.C.

(57) ABSTRACT

In one embodiment a controller comprises logic to receive, via a near field communication link, an identification packet generated by a remote authentication provider, associate an electronic signature with the identification packet, transmit the identification packet to a remote authentication provider, receive an authorization from the remote authentication provider, receive login information associated with the identification packet, and initiate a login procedure using the login information. Other embodiments may be described.

24 Claims, 5 Drawing Sheets

(56) References Cited

OTHER PUBLICATIONS

International Search Report and Written Opinion received for PCT Application No. PCT/US2011/067532, mailed on Sep. 24, 2012, 9 pages.
Chang et al., "Remote Password Authentication with Smart Cards", IEE Proceedings-E, vol. 138, Issue No. 3, May 1991, pp. 165-168.
Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDO Alliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript API, FIDO Alliance Proposed Standard, May 14, 2015, pp. 1-7, FIDO Alliance.
Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance Proposed Standard, Dec. 8, 2014, pp. 1-202.
Japanese Patent Office, Office Action mailed on Jul. 21, 2015, in Japanese Patent Application No. 2014-550249.
Korea Patent Office, Korean Office Action mailed Oct. 21, 2015 in Korean Patent Application No. 2014-7017998.
European Patent Office, Extended Search Report mailed Oct. 8, 2015 in European Patent Application No. 11878513.8.
Korean Intellectual Property Office, Notice of Final Rejection mailed Apr. 19, 2016 in Korean Patent Application No. 20147017998. (Translation Redacted).

* cited by examiner

AUTHENTICATION FOR NETWORK ACCESS RELATED APPLICATIONS

BACKGROUND

The subject matter described herein relates generally to the field of network access and more particularly to systems and methods which allow electronic devices to utilize third party authentication systems operated by a remote authentication provider to implement authentication protocols for network access.

Large corporate networks are often protected by authentication technologies which enable authorized users to access the networks while inhibiting or preventing unauthorized personnel from accessing the networks. Small business environments face more difficult challenges in securing corporate networks. Business-class authentication technology is expensive and complex, and is frequently beyond the financial and technical capabilities of small businesses.

Accordingly systems and techniques to provide authentication techniques to secure computing environments may find utility, particularly in small business settings.

BRIEF DESCRIPTION OF THE DRAWINGS

The detailed description is described with reference to the accompanying figures.

DETAILED DESCRIPTION

Described herein are exemplary systems and methods to implement authentication for network access in electronic devices. Some embodiments of the systems and methods described herein may find utility in the context of network security, and particularly in small business settings. Some embodiments described herein may allow small businesses to leverage various authentication platforms offered by a third party, such that the third party functions as a remote authentication provider. By way of example, users of the system may be assigned an identification packet which may include credentials issued by the third party or parties. The identification packet may be stored in a suitable memory location, e.g., a magnetic strip card, a smart card, or a memory module associated with an electronic device.

A user who wishes to access a network may initiate a login procedure via an electronic device. During the login procedure the identification packet may be transmitted from the electronic device to the remote authentication provider through a secure communication channel. The remote authentication provider may implement one or more authentication routines using data in the identification packet and may return a response that either confirms or denies that the user is authorized for network access. Based on the response, the electronic device then either completes or terminates a login procedure to the network.

This document provides description of hardware and software environments in which authentication for network access may be implemented and of exemplary operations to implement authentication for network access. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
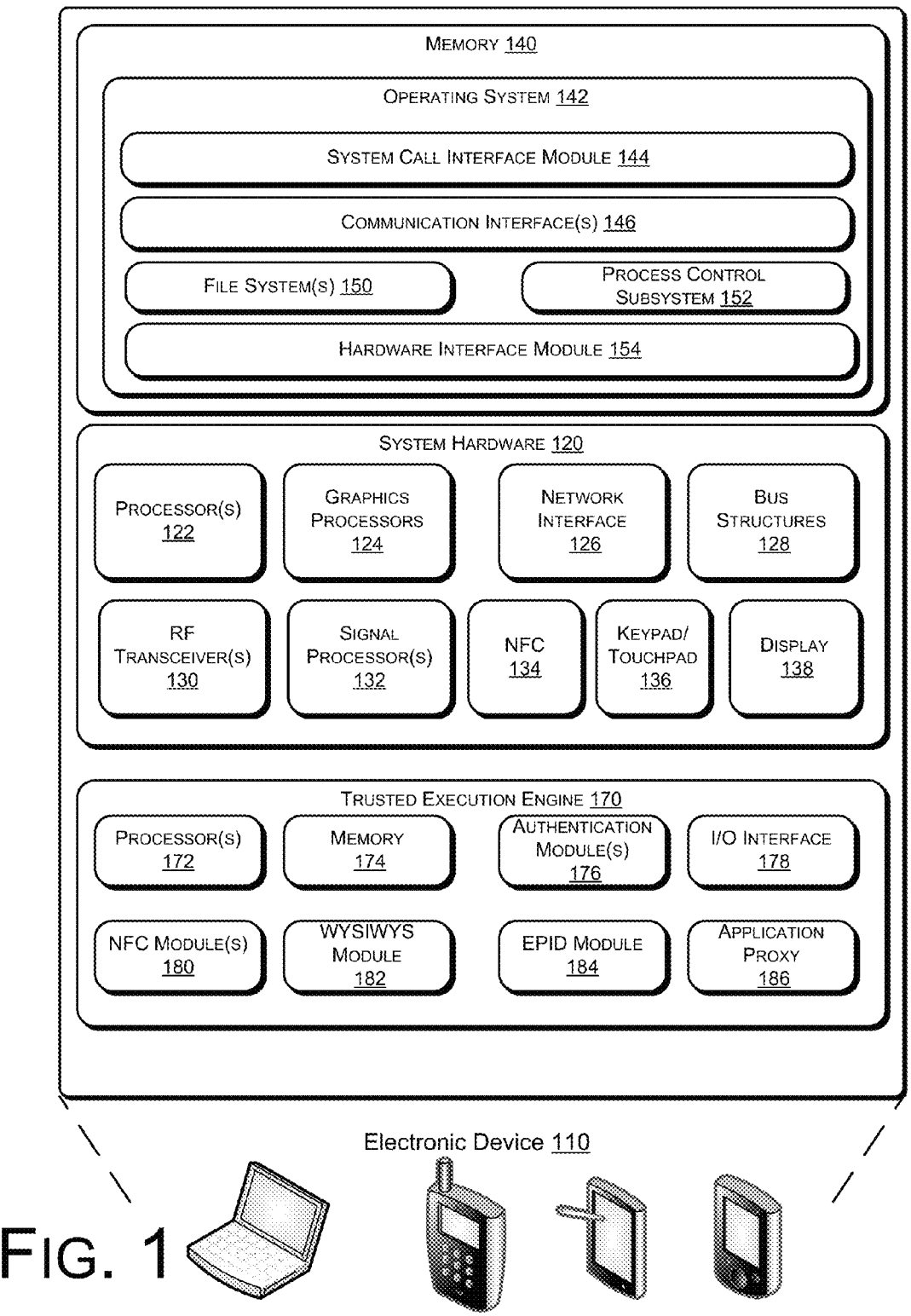
FIG. 1 is a schematic illustration of an exemplary electronic device which may be adapted to include infrastructure to implement authentication for network access in accordance with some embodiments.

FIG. 1 is a schematic illustration of an exemplary electronic device 110 which may be adapted to implement authentication for network access in accordance with some embodiments. As illustrated in FIG. 1, electronic device 110 may be embodied as a conventional mobile device such as a mobile phone, tablet computer portable computer, or personal digital assistant (PDA).

In some embodiments an electronic device may include a trusted execution environment, which may also be referred to as a trusted execution engine or sometimes as a secure element or a manageability engine. The trusted execution environment may comprise one or more controllers that are separate from the primary execution environment, sometimes referred to as an untrusted execution environment. The separation may be physical in the sense that the trusted execution environment may be physically separate from the untrusted execution environment. Alternatively, the trusted execution environment may logical in the sense that the trusted execution environment may be hosted on same chip or chipset that hosts the untrusted execution environment, but separated at the silicon level such that the trusted execution environment is secure.

In various embodiments, electronic device 110 may include or be coupled to one or more accompanying input/output devices including a display, one or more speakers, a keyboard, one or more other I/O device(s), a mouse, or the like. Exemplary I/O device(s) may include a touch screen, a voice-activated input device, a track ball, a geolocation device, an accelerometer/gyroscope, biometric feature input devices, and any other device that allows the electronic device 110 to receive input from a user.

The electronic device 110 includes system hardware 120 and memory 140, which may be implemented as random access memory and/or read-only memory. A file store may be communicatively coupled to computing device 110. The file store may be internal to computing device 110 such as, e.g., eMMC, SSD, one or more hard drives, or other types of storage devices. File store 180 may also be external to computer 110 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 110 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 110 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11x. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/ GSM Association, Ver. 3.0.1, December 2002).

Electronic device 110 may further include one or more input/output interfaces such as, e.g., a keypad 136 and a display 138. In some embodiments electronic device 110 may not have a keypad and use the touch panel for input.

Memory 140 may include an operating system 142 for managing operations of computing device 110. In one embodiment, operating system 142 includes a hardware interface module 154 that provides an interface to system hardware 120. In addition, operating system 140 may include a file system 150 that manages files used in the operation of computing device 110 and a process control subsystem 152 that manages processes executing on computing device 11.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

Electronic device 110 may comprise a trusted execution engine 170. In some embodiments the trusted execution engine 170 may be implemented as an independent integrated circuit located on the motherboard of the electronic device 110, while in other embodiments the trusted execution engine 170 may implemented as a dedicated processor block on the same SOC die, while in other embodiments the trusted execution engine may be implemented on a portion of the processor(s) 122 that is segregated from the rest of the processor(s) using HW enforced mechanisms In the embodiment depicted in FIG. 1 the trusted execution engine 170 comprises a processor 172, a memory module 174, one or more authentication module(s) 176, and an I/O module 178, a near field communication (NFC) module, a what you see is what you sign (WYSIWYS) module 182, an enhanced privacy identification (EPID) module 184 and one or more application proxies 186. In some embodiments the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the trusted execution engine 170 is separate from the main processor(s) 122 and operating system 142, the trusted execution engine 170 may be made secure, i.e., inaccessible to hackers who typically mount SW attacks from the host processor 122.

Figure 2:
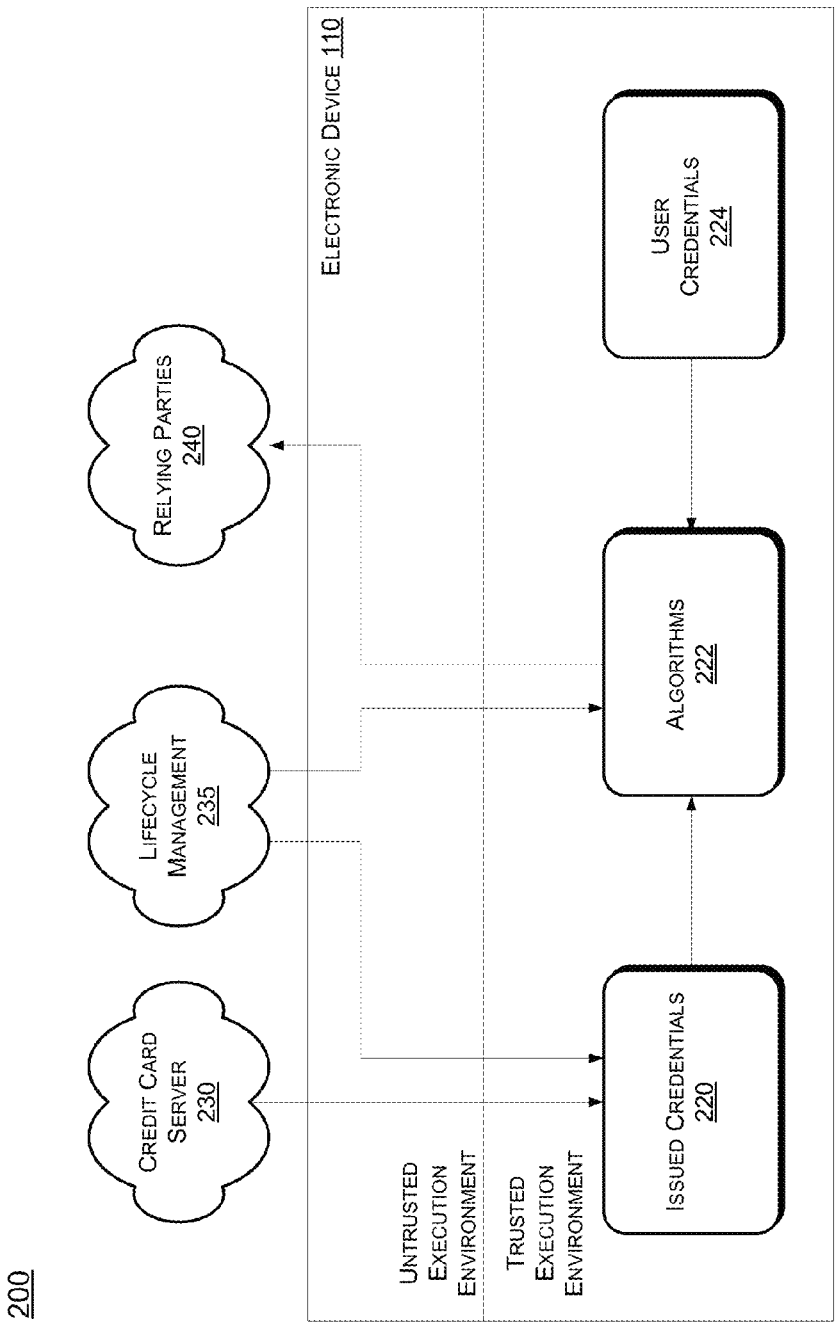
FIG. 2 is a high-level schematic illustration of an exemplary architecture for authentication for network access in accordance with some embodiments.

In some embodiments the trusted execution engine may define a trusted execution environment in a host electronic device in which authentication for network access procedures may be implemented. FIG. 2 is a high-level schematic illustration of an exemplary architecture for authentication for network access accordance with some embodiments. Referring to FIG. 2, a host device 210 may be characterized as having an untrusted execution environment and a trusted execution environment. When the host device 210 is embodied as an electronic device 110 the trusted execution environment may be implemented by the trusted execution engine 170, while the untrusted execution environment may be implemented by the main processors(s) 122 and operating system 140 of the system 100. As illustrated in FIG. 2, remote entities that issue credentials, identified as issuers 230 in FIG. 2, supply credentials, which are stored in the trusted execution environment of the host device 210. In use, the issued credentials and one or more user credentials 224 may be provided as inputs to one or more authentication algorithms 222, which process the credentials and generate a token, which may be provided to one or more relying parties 240. Integrity of the trusted execution environment may be maintained through exclusive, cryptographically-protected, relationships between a trusted execution environment and entities that are allowed to issue credentials into 220 or lifecycle manage 235 the contents and algorithms 222 of the trusted execution environment.

Figure 3:
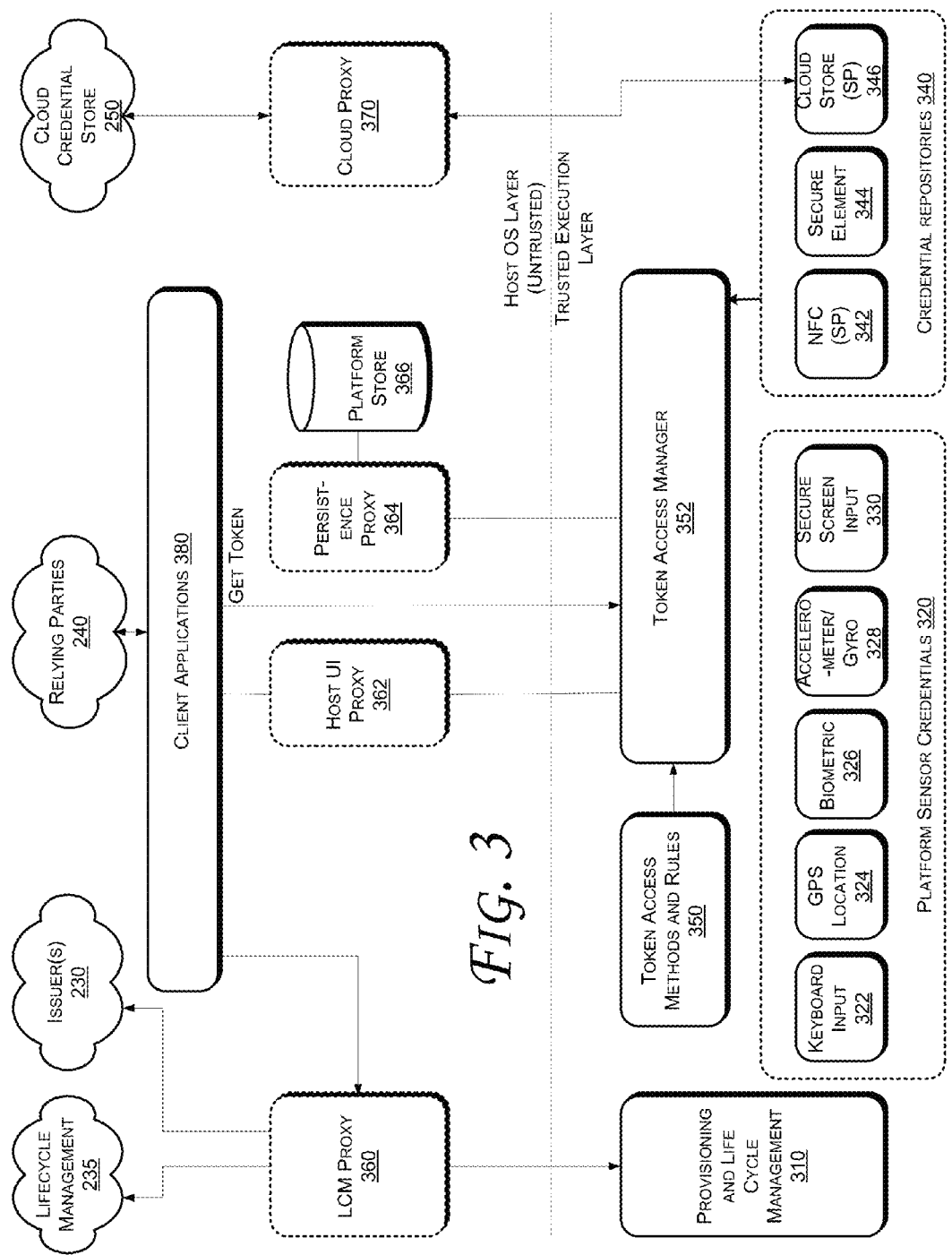
FIG. 3 is a schematic illustration of an exemplary architecture for authentication for network access in accordance with some embodiments.

FIG. 3 is a schematic illustration in greater detail of an exemplary architecture for virtual point of sale transactions accordance with some embodiments. In the embodiment depicted in FIG. 3, the trusted execution layer comprises a provisioning and life cycle management module 310, a platform sensor credentials module 320, and a set of credential repositories 340. A token access manager module 352 accepts as inputs one or more token access methods and rules 350 stored in the trusted execution layer.

In the embodiment depicted in FIG. 3 the platform sensor credential may comprise one or more of a secured keyboard input path credential 322, a GPS location credential, a biometric credential 326, an accelerometer or gyroscope credential 328, or a malware-interception-resistant secure screen input mechanism credential 330. The credential repositories 340 may comprise a NFC input device 342, one or more secure elements 344, and a cloud credential store access mechanism 346.

The untrusted execution layer (i.e., the Host Operating System layer) implements one or more proxies to facilitate communication with the trusted execution layer components. Thus, the untrusted execution layer maintains a life cycle management proxy 360 to facilitate communicate between the provisioning and life cycle management module 310 and remote issuers 230 of credentials, and entities delegated to securely manage 235 the trusted execution layer. Similarly, a host proxy 362 facilitates communication between one or more client applications 380 which execute in the untrusted execution layer and the token access manager 352. A persistence proxy 364 provides a communication link between the token access manager 352 and a platform data store 366. A cloud proxy 370 provides a communication link between cloud credential stores 250 and the cloud store access mechanism 346.

In use, the system my obtain credentials from a variety of sources. For example, issuers 230 may issue credentials to the system via the LCM proxy 360. Issued credentials may include dynamic one-time password (OTP) generation seeds, user certificates (e.g., x509 certificates with public/private key pairs), financial information (e.g., credit card information), bank card information, or the like. Issued credentials may be stored in one or more of the credential repositories 340. By contrast, the platform sensor credentials 320 may be obtained from the user in response to requests from a relying party, either in real time during an authentication process or in advance. One skilled in the art will recognize that platform sensor credentials may be requested indirectly as the result of the relying party asking for other credential, as described below, or even directly by a relying party. By way of example, biometric signatures may be cataloged for users, allowing a centrally-run authentication verification system. Using embodiments described herein, a relying party could ask the platform for a fingerprint credential. The platform would obtain this credential using its fingerprint acquisition hardware, and would return this information to the requesting/relying party.

Figure 4:
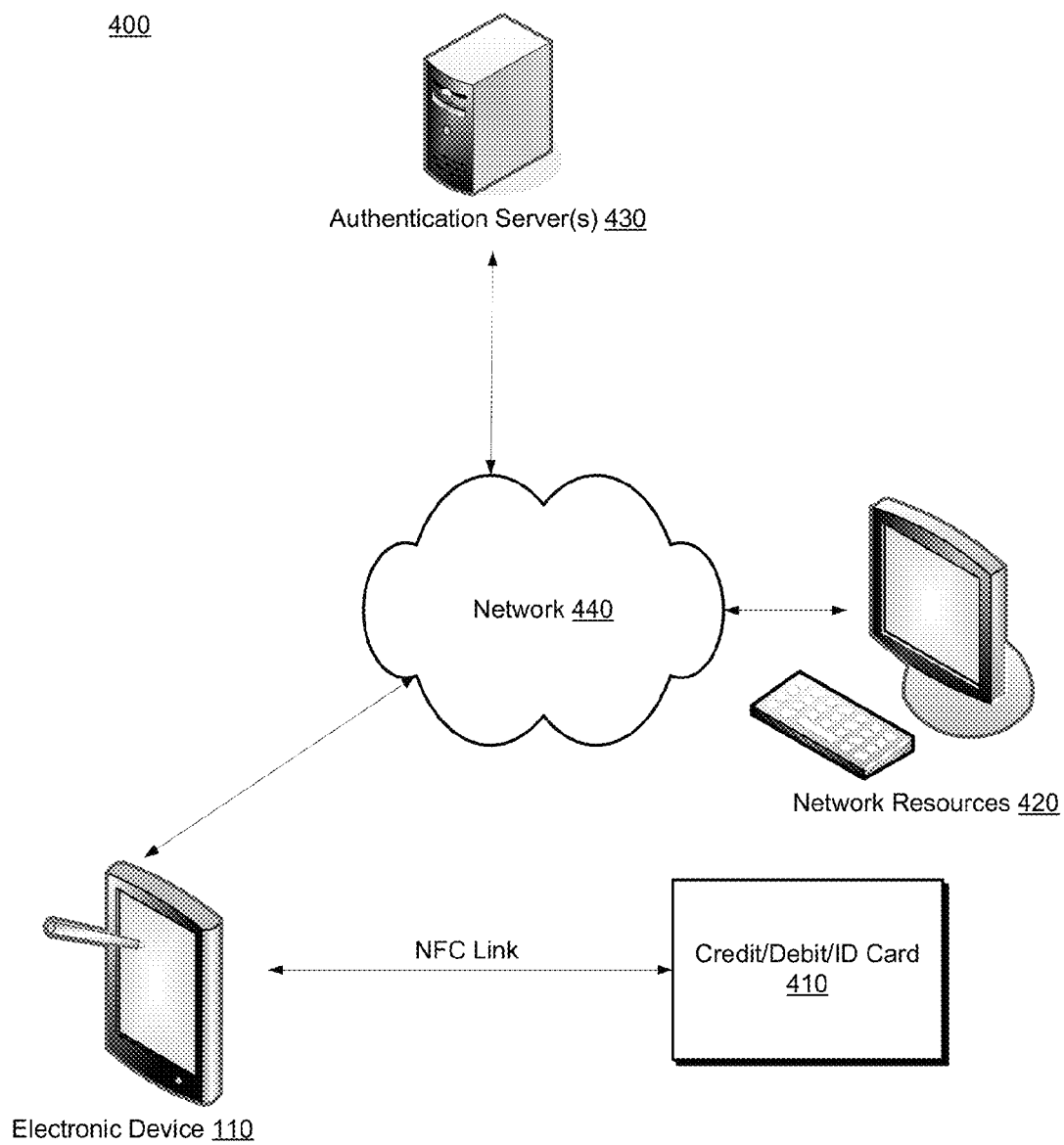
FIG. 4 is a schematic illustration of an exemplary system for authentication for network access, in accordance with some embodiments.

FIG. 4 is a schematic illustration of a system for authentication for network access according to some embodiments. Referring to FIG. 4, an electronic device 110 may be coupled to one or more network resources 420 and to one or more authentication servers 430 via a network 440. Electronic device 110 may comprise a near field communication (NFC) interface to enable wireless communication with a remote device, e.g., a debit/credit or ID card 410. In some embodiments electronic device 110 may be embodied as a mobile telephone, tablet, PDA or other mobile computing device as described with reference to electronic device 110, above. Network 440 may be embodied as a public communication network such as, e.g., the internet, or as a private communication network, or combinations thereof. Debit/credit or ID card 410 may comprise magnetic strip data which identifies the user. In some embodiments the magnetic stripe data may be wrapped using an encryption key.

Authentication server(s) 430 may be embodied as computer systems. In some embodiments the server(s) 430 may be embodied as an authentication server and may be managed by a vendor or by a third party which operates secure platform. Authentication server(s) 430 may be operated by a vendor or by a third-party payment system, e.g., a transaction clearing service or a credit card service.

Having described various structures of systems for authentication for network access, operating aspects of such systems will be explained with reference to FIG. 5, which is a flowcharts illustrating operations in a method to implement authentication for network access in accordance with some embodiments. In some embodiments the operations depicted in the flowchart of FIG. 5 may be implemented by the various module(s) 176 of the trusted execution engine 170 depicted in FIG. 1, alone or in combination with software modules which may execute on the operating system of an electronic device.

Figure 5:
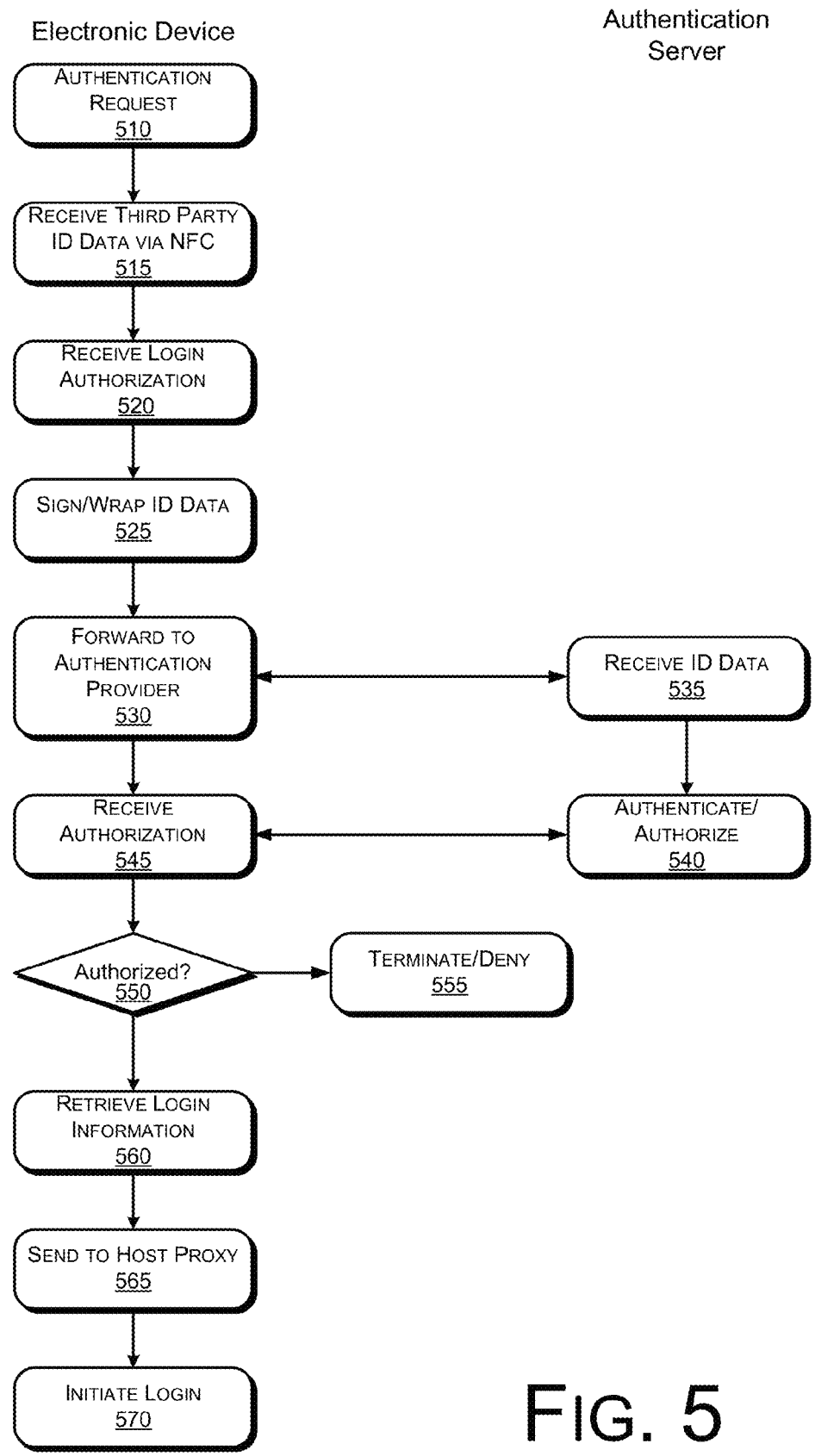
FIG. 5 is a flowchart illustrating operations in a method to implement authentication for network access in accordance with some embodiments.

Referring to FIG. 5, in some embodiments the operations depicted in FIG. 5 enable a user to implement authentication for network access by leveraging third party authentication capabilities provided by authentication server 430. In some embodiments the electronic device may be embodied as a handheld computing device comprising a trusted execution engine as depicted in FIGS. 1-5. Similarly, an authentication server may be embodied as a computing device comprising a trusted execution engine as depicted in FIGS. 1-5. Referring to FIG. 5, at operation 510 an authentication request is received by the electronic device. By way of example, in some embodiments the authentication request may be initiated by a user initiating a login sequence, e.g., by tapping a magnetic stripe data card on the electronic device 110 or otherwise launching an authentication application. In response to the authentication request the processor 172 of the trusted execution engine 170 launches the authentication module 176.

At operation 515 the electronic device receives a third-party identification packet via a near field communication (NFC) communication link. By way of example, in some embodiments the authentication module 176 invokes the NFC module 180 to initiate a secure communication link to retrieve the identification packet encoded on the magnetic stripe data on the magnetic stripe data card via the I/O interface on the trusted execution engine. Because the I/O operation is executed from the trusted execution engine, the data retrieved from the magnetic stripe card is never exposed to the operating system of the electronic device, and is therefore secure from being accessed maliciously.

At operation 520 the electronic device receives a login authorization. By way of example, in some embodiments the WYSIWYS module 182 opens a secure window on a display of electronic device and presents an authorization request on the window. A user of the electronic device responds to the authorization request by entering an input in the secure window, which authorizes the login request. The WYSIWYS module 182 generates a pin which is associated with the input.

At operation 525 the identification packet is signed and wrapped for transport to the remote authentication provider. By way of example, in some embodiments the authentication module 176 invokes the EPID module, which wraps the identification packet and applies a signature that attests that the packet was obtained securely over the NFC communication link and that the WYS pin was obtained securely using the WYSIWYS module.

At operation 530 the electronic device 110 forwards the wrapped identification packet to the remote authentication server 430, which receives the packet at operation 535. By way of example, in some embodiments the authentication module 176 establishes a secure end-to-end session with the remote authentication server 430 using data in the identification packet to obtain the user's account information with the remote authentication provider 430.

At operation 540 the remote authentication provider 430 authenticates and authorizes the user using the data provided with the identification packet. By way of example, in some embodiments the remote authentication provider 430 verifies that the user is authentication and may perform one or more anti-fraud processes to detect and/or inhibit fraudulent use of the data in the identification packet. The remote authentication server 430 returns an authorization response to the electronic device 110.

At operation 545 the electronic device 110 receives the authorization response. By way of example, in some embodiments the response is received via the I/O interface 178 in the trusted execution engine 170 and is therefore not accessible to the untrusted operating environment of the electronic device 110.

At operation 550 the authentication module 176 reviews the response from the remote authentication provider. If, at operation 550, the response from the remote authentication server 430 indicates that the login is not authorized then control passes to operation 555 and the login procedure is terminated and access denied. By contrast, if at operation 550 the response from the remote authentication server 430 indicates that the login is authorized then control passes to operation 560 and login information for the user is retrieved. By way of example, in some embodiments the authentication module 176 searches a local database that contains mappings from network users and domains to the account information associated with the data in the identification packet.

At operation 565 the login information is sent from the authentication module 176 to a host proxy. The specific form of the login information may be a function of the type of login requested. By way of example, if a local login was requested then a local login credential is returned. By contrast, if a domain login was requested, then domain login credentials are returned. Similarly, if a web login was requested, then web credentials are returned. The host proxy establishes a connection to the appropriate backend service and supplies the credential, and at operation 570 normal login procedures may be implemented.

In some embodiments the remote service provider 430 may be managed by a third-party service provider which offers authentication services. By way of example, in some embodiments the credit card 410 may be issued by VISA and the VISA network may be utilized to provide authentication and fraud detection services. One skilled in the art will recognize that alternate service providers may be utilized.

Thus, there is described herein an architecture and associated methods to implement authentication for network access in electronic devices. In some embodiments the architecture uses hardware capabilities embedded in an electronic device platform to provide assurances to transaction-authorizing parties that a transaction is being made by an authorized individual. In the embodiments described herein authentication and persistence are based processing that occurs within a trusted environment, separate from the host operating system. The execution environment may be implemented in a trusted execution engine, which obtains and verifies user identity, then provides proof of identity verification, and may provide other elements required to satisfy transaction requirements. The result is a platform-issued token that represents fulfillment of these required elements to relying parties. In some embodiments the trusted execution engine may be implemented in a remote or attachable device, e.g., a dongle, The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller comprising:
   logic to:
   receive an authentication request from a user for an authentication for access via user initiation of a login procedure;
   receive, during the authentication, via a near field communication link with a data card, an identification packet generated by a remote authentication provider;
   sign the identification packet to attest that the identification packet was securely received via the near field communication link and that the user authorized the authentication request;
   transmit the identification packet to the remote authentication provider;
   receive an authorization from the remote authentication provider, responsive to information in the identification packet;
   after receipt of the authorization, retrieve from a local storage login information associated with the identification packet; and
   implement the login procedure using the login information, to enable the user to access a network resource remotely coupled to the controller.

2. The controller of claim 1, wherein the logic comprises a near field wireless communication interface to communicate with a remote device.

3. The controller of claim 1, further comprising logic to detect an initiation input signal.

4. The controller of claim 3, wherein:
   the identification packet comprises data associated with the data card issued by the remote authentication provider; and
   the initiation input signal is to be generated in response to the data card being within a predetermined physical proximity of the controller.

5. The controller of claim 1, further comprising logic to create a secure communication channel between the controller and the remote authentication provider.

6. The controller of claim 1, further comprising logic to obtain a transaction authorization from the user of the controller.

7. The controller of claim 1, further comprising logic to provide a login credential to the network resource coupled to the controller.

8. An electronic device, comprising:
   a processor to execute an operating system which is to implement an untrusted computing environment; and
   a controller, comprising:
   a memory; and
   logic to:
   receive an authentication request from a user for an authentication for access via user initiation of a login procedure;
   receive, during the authentication, via a near field communication link with a data card, an identification packet generated by a remote authentication provider;
   sign the identification packet to attest that the identification packet was securely received via the near field communication link and that the user authorized the authentication request;
   transmit the identification packet to the remote authentication provider;
   receive an authorization from the remote authentication provider, responsive to information in the identification packet;
   after receipt of the authorization, retrieve from a local storage login information associated with the identification packet; and
   implement the login procedure using the login information, to enable the user to access a network resource remotely coupled to the controller.

9. The electronic device of claim 8, wherein the logic comprises a near field wireless communication interface to communicate with a remote device.

10. The electronic device of claim 8, further comprising logic to detect an initiation input signal.

11. The electronic device of claim 10, wherein:
    the identification packet comprises data associated with the data card issued by the remote authentication provider; and
    the initiation input signal is to be generated in response to the data card being within a predetermined physical proximity of the controller.

12. The electronic device of claim 8, further comprising logic to create a secure communication channel between the controller and the remote authentication provider.

13. The electronic device of claim 8, further comprising logic to obtain a transaction authorization from the user of the controller.

14. The electronic device of claim 8, further comprising logic to provide a login credential to the network resource.

15. A method, comprising:
    receiving, during an authentication for access, via a near field communication link with a data card, an identification packet generated by a remote authentication provider;
    associating an electronic signature with the identification packet;
    transmitting the identification packet to the remote authentication provider;
    receiving an authorization from the remote authentication provider, responsive to information in the identification packet;
    responsive to the authorization, retrieving login information associated with the identification packet in a host proxy of an electronic device from a local database; and
    initiating a login procedure using the login information, to enable the user to access a network resource remotely coupled to the electronic device.

16. The method of claim 15, further comprising detecting an initiation input signal.

17. The method of claim 16, wherein:
    the identification packet comprises data associated with the data card issued by the remote authentication provider; and
    the initiation input signal is to be generated in response to the data card being within a predetermined physical proximity of the controller.

18. The method of claim 15, further comprising creating a secure communication channel between a controller and the remote authentication provider.

19. The method of claim 15, further comprising obtaining a transaction authorization from a user of a controller.

20. A computer program product comprising logic instructions stored on non-transitory computer readable medium which, when executed by a processor, configure the processor to:

receive, during an authentication for access, via a near field communication link with a data card, an identification packet generated by a remote authentication provider;
associate an electronic signature with the identification packet;
transmit the identification packet to the remote authentication provider;
receive an authorization from the remote authentication provider, responsive to information in the identification packet;
responsive to the authorization, retrieve from a local storage login information associated with the identification packet in a host proxy of an electronic device from a local database; and
initiate a login procedure using the login information, to enable the user to access a network resource remotely coupled to the electronic device.

21. The computer program product of claim 20, further comprising logic instructions stored on non-transitory computer readable medium to implement a near field wireless communication interface to communicate with a remote device.

22. The computer program product of claim 20, further comprising logic instructions stored on non-transitory computer readable medium to detect an initiation input signal.

23. The computer program product of claim 22, wherein:
the identification packet comprises data associated with the data card issued by the remote authentication provider; and
the initiation input signal is to be generated in response to the data card being within a predetermined physical proximity of a controller.

24. The computer program product of claim 23, further comprising logic instructions stored on non-transitory computer readable medium to create a secure communication channel between the electronic device and the remote authentication provider.

* * * * *